United States Patent [19]
Lipari et al.

[11] Patent Number: 6,161,483
[45] Date of Patent: Dec. 19, 2000

[54] ACCUMULATOR MECHANISM FOR DETACHING TROLLEYS FROM DRIVE CHAINS IN POWER AND FREE CONVEYOR SYSTEM

[75] Inventors: Mario L. V. Lipari, Stanley, Kans.; Mark C. Reid, Lee's Summit, Mo.; John D. Gorby, Jr., Ottawa, Kans.

[73] Assignee: Conveyor Technology Group, Kansas City, Kans.

[21] Appl. No.: 09/118,449

[22] Filed: Jul. 17, 1998

[51] Int. Cl.[7] ...................................................... B61B 13/00
[52] U.S. Cl. ......................................................... 104/172.3
[58] Field of Search ............................. 104/172.1, 172.2, 104/172.3, 172.4

[56] References Cited

U.S. PATENT DOCUMENTS

| | | | |
|---|---|---|---|
| 3,799,327 | 3/1974 | Schulz .................................. | 104/172.3 |
| 3,837,289 | 9/1974 | Marshman et al. . | |
| 3,995,561 | 12/1976 | Allor .................................... | 104/172.3 |
| 4,004,680 | 1/1977 | Warmann ............................. | 104/172.3 |
| 4,143,599 | 3/1979 | Krammer ............................. | 104/172.4 |
| 4,408,540 | 10/1983 | Dehne . | |
| 4,438,701 | 3/1984 | Muria et al. . | |
| 4,542,698 | 9/1985 | Wakabavashi . | |
| 4,593,624 | 6/1986 | Spiker . | |
| 4,771,700 | 9/1988 | Wakabayaski . | |
| 4,790,247 | 12/1988 | Summa . | |
| 4,885,997 | 12/1989 | Wakahayashi . | |
| 5,303,655 | 4/1994 | Summa et al. . | |
| 5,511,486 | 4/1996 | Pollard et al. . | |

OTHER PUBLICATIONS

Assembly Drawing Tsubaki 343 I.P.F. Trolley dated 09/11/1996.

Mid–West Conveyor brochure entitled "The Mid–West IPF–4 and IPF–6" dated 1986.

Mid–West Conveyor brochure entitled "Floor Conveyors", pp. 3.02–3.18, dated 1980.

*Primary Examiner*—Mark T. Le
*Attorney, Agent, or Firm*—Hovey, Williams, Timmons & Collins

[57] ABSTRACT

An accumulator mechanism for stopping a carrier on an inverted power and free conveyor system when it approaches a stopped preceding carrier. A pivot arm on a leading trolley for each carrier has a retractable trolley dog which is normally driven by a chain dog projecting from a drive chain. The accumulator mechanism includes an actuator lever which is pivoted to mounting plates and carries a cam roller that acts in a cam slot formed in a pivot plate. When the actuating lever is pivoted due to contacting a preceding carrier, the cam roller acts within the contour of the slot to pivotally displace the pivot plate. The pivot plate then pulls a lift link upwardly to pull on the pivot arm and retract the trolley dog from the chain dog. The slot is arranged to effect lost motion of the cam roller in the slot to accommodate over travel.

25 Claims, 2 Drawing Sheets

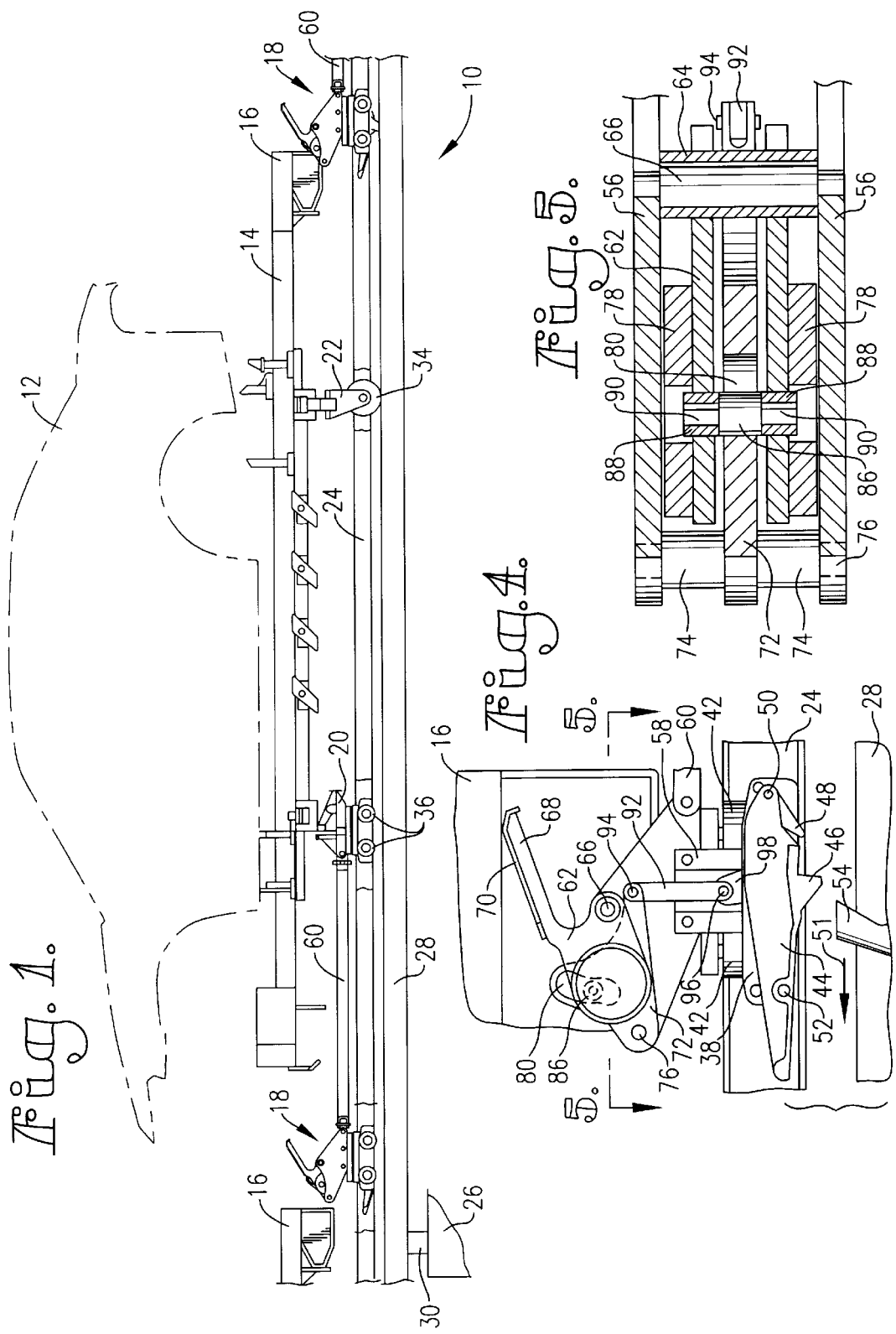

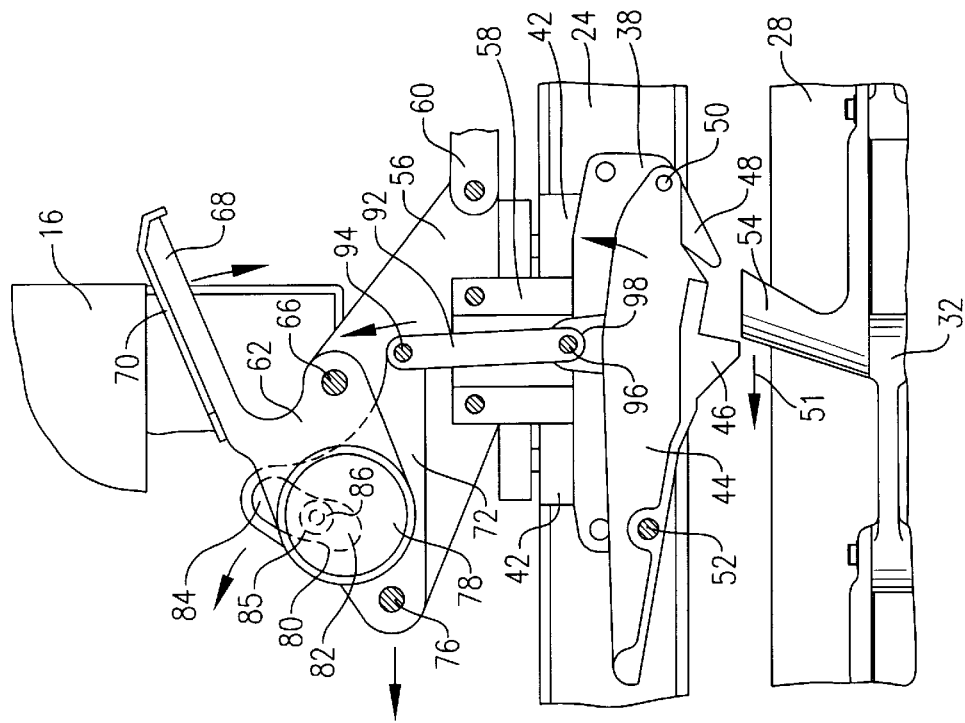
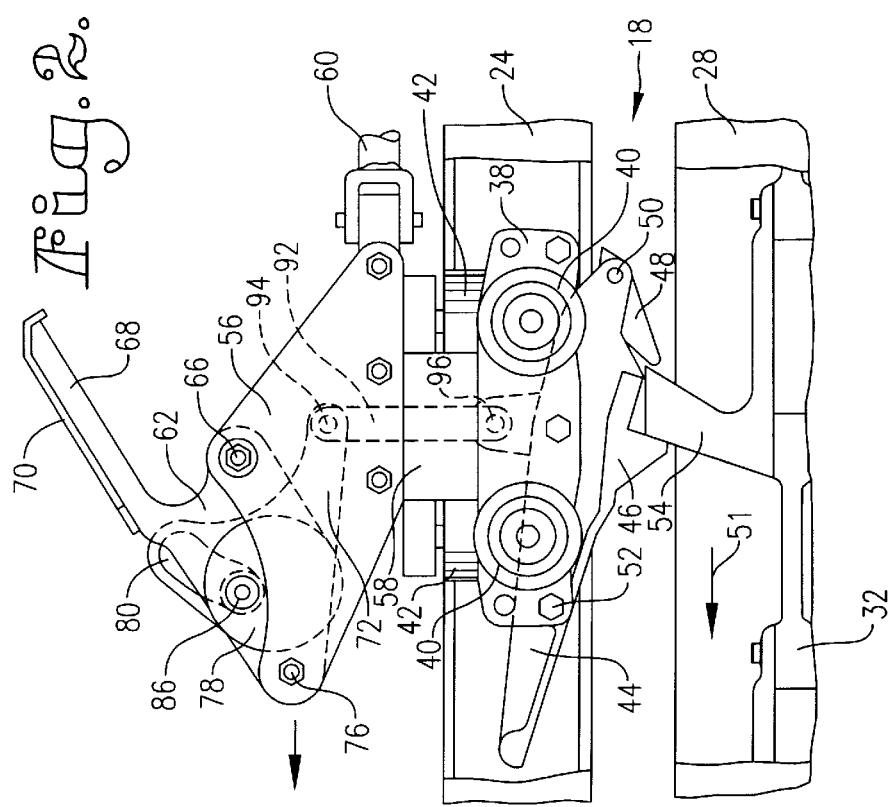

6,161,483

ACCUMULATOR MECHANISM FOR DETACHING TROLLEYS FROM DRIVE CHAINS IN POWER AND FREE CONVEYOR SYSTEM

FIELD OF THE INVENTION

This invention relates generally to conveyor systems and more particularly to conveyors of the type commonly known as power and free conveyors. Still more particularly, the invention relates to a mechanism for detaching the trolleys of power and free conveyors from the drive chain when the trolleys approach preceding carriers that are stopped on the conveyor track.

BACKGROUND OF THE INVENTION

In automobile assembly plants and other applications, large conveyor systems are commonly used to convey articles such as partially completed automobile bodies between work stations arranged along the conveyor path. One type of conveyor system that has been popular in this type of application is known as a power and free conveyor. A power and free conveyor includes a chain which is driven continuously along a track. The automobile bodies or other articles are conveyed on carriers which are mounted on wheeled trolleys riding on another track. The chain has spaced apart drive dogs that are detachably engaged with retractable dogs on the trolleys so that each trolley which has its retractable trolley dog engaged by a chain dog is driven along the conveyor path.

Power and free conveyors can be overhead systems where the load is suspended from the carrier. Alternatively, inverted power and free conveyors have the load on top of the carrier with the chain running beneath the trolleys and the chain dogs projecting upwardly.

Normally, a number of work stations are located along the conveyor where the carriers are stopped so that various types of operations can be performed on the work. Stop mechanisms have been developed for detaching the trolley dog from the chain dog in order to stop the carrier at the location of each work station. For example, retractable blades and cams can be installed at each work station and extend into the path of an approaching trolley. A pivot arm carrying the trolley dog is engaged by the stop device and pivoted in a direction to detach the trolley dog from the chain dog, thus stopping the trolley while the chain continues to move and convey other trolleys along the conveyor path.

Accumulation of carriers occurs in this type of conveyor system. If a carrier is stopped and the succeeding carrier approaches it, the incoming carrier must be stopped before it bangs into the stopped carrier and causes damage to the equipment and possibly to personnel in the vicinity. Accumulation devices of various types have been used to stop carriers which approach preceding carriers that are stationary. Usually, the trolley on the trailing end of each carrier is equipped with a cam surface which is engaged by the pivot arm of the trolley on the leading end of the succeeding carrier. When the pivot arm comes into contact with the cam surface, the trolley arm is pivoted to a retracted position wherein the trolley dog is released from the drive dog on the chain.

Accumulator mechanisms of this type are characterized by cost and complexity and have been plagued by other problems, particularly in the area of reliability. In order to function properly, the trailing cam surface must be located properly to intercept the incoming trolley arm. There is little tolerance for error, so if either part is bent up or down or sidewardly, or if the parts are misaligned slightly for some other reason, the pivot arm may not be retracted far enough to fully release the trolley dog from the chain dog, and serious adverse consequences can result. Conversely, the pivot arm may be subjected to over travel which can bend or break the arm or associated parts of the trolley. In either case, costly repairs must be made to the conveyor equipment, and it may be necessary to take the system out of production for an extended time while it is being repaired.

SUMMARY OF THE INVENTION

The present invention is directed to an improved accumulation device for a conveyor system which operates reliably to stop carriers which approach preceding carriers on the conveyor track. It is the principal goal of the invention to provide an accumulation mechanism which is specially constructed in a manner to function properly even if the cooperating parts are bent or otherwise deformed from their original condition.

More particularly, it is an object of the invention to provide an accumulation mechanism which is arranged to assure that the trolley arm is pivoted sufficiently to disengage the trolley dog from the chain dog while avoiding over travel of the pivot arm or other parts. Accordingly, the mechanism operates reliably within a wide range of tolerance and yet is not subjected to possible damage resulting from unintended over travel.

Another important object of the invention is to provide an accumulator mechanism of the character described which is well suited for addition to an existing trolley mechanism operated by a conventional stop device. This allows the existing stop mechanism to be used along with the mechanism of the present invention so that equipment modification and costs are minimized.

A further object of the invention is to provide an accumulator mechanism which is economical to manufacture and which is characterized by a sturdy construction.

These and other objects are achieved by the provision of an accumulator mechanism that includes an actuating lever pivotally mounted between a pair of side plates forming a rigid frame mounted on the trolley. A pivot plate is also pivotally mounted on the frame to turn on a pivot axis offset from the pivot axis for the actuating lever. A cam roller carried on the lever acts in a cam slot in the pivot plate. When the lever comes into contact with a preceding carrier on the conveyor path, the lever is pivoted to move the cam roller in the slot. The slot has a special configuration that causes the plate to pivot in a direction to raise a lifting link which is attached to the arm carrying the trolley dog. The lift link pulls the trolley arm in a direction to disengage the trolley dog from the drive dog on the chain.

The actuating lever has a plate that is located to come into engagement with the preceding carrier. The plate is long enough that some part of it will contact the carrier even if one or both parts are bent to a considerable extent. Consequently, the actuating lever will be actuated even if the parts are deformed.

It is a particular feature of the invention that the slot has a dual arc configuration. The slot configuration is such that an initial small increment of movement of the cam roller pivots the plate sufficiently that the trolley dog is completely disengaged. Further movement of the cam roller in the slot is essentially lost motion which has no effect on the pivot plate. Therefore, if the actuating lever is pivoted beyond the range of its normal movement, the cam roller simply moves idly in the slot and there is no over travel of any parts or binding that could break the mechanism. At the same time, the small increment of lever movement that is effective to disengage the trolley dog assures reliable disengagement even if the parts are deformed.

BRIEF DESCRIPTION OF THE DRAWINGS

In the accompanying drawings which form a part of the specification and are to be read in conjunction therewith and in which like reference numerals are used to indicate like parts in the various views:

FIG. 1 is a fragmentary side elevational view of a conveyor that is equipped with an accumulation mechanism constructed according to a preferred embodiment of the present invention, with portions broken away illustrative purposes;

FIG. 2 is a fragmentary side elevational view of the mechanism of the present invention, with the actuating lever fully extended and the chain dog engaging the trolley dog to convey the trolley along the conveyor path;

FIG. 3 is a fragmentary elevational view similar to FIG. 3, but showing the actuating lever partially depressed by a preceding carrier frame to disengage the trolley dog from the chain dog;

FIG. 4 is a fragmentary elevational view similar to FIGS. 2 and 3 but on a reduced scale and showing the actuating lever fully depressed by the preceding carrier frame; and FIG. 5 is a fragmentary sectional view on an enlarged scale taken generally along line 5—5 of FIG. 4 in the direction of the arrows.

DETAILED DESCRIPTION OF THE INVENTION

Referring now to the drawings in more detail and initially to FIG. 1, numeral 10 generally designates an inverted power and free conveyor of the type commonly used in automobile assembly plants and other applications. The conveyor 10 is used to convey parts such as the partially completed automobile body 12 which is supported on a carrier 14. The carrier may take the form of a horizontal platform having a frame 16 on its trailing end. The carrier 14 is mounted on a plurality of wheeled trolleys which may include a leading trolley 18, an intermediate trolley 20 and a trailing trolley 22.

The conveyor 10 has a conventional construction for the most part. The wheels of the trolleys 18, 20, and 22 ride along a conveyor track 24 which is suitably mounted near the floor 26 of the building in which the conveyor is located. Another track 28 is mounted below track 24 and may be supported on spaced apart track supports 30. The lower track 28 provides a track for a flexible drive chain 32 (see FIGS. 2 and 3) which is driven by a suitable drive unit. The chain 32 is typically equipped with spaced apart wheels (not shown) which ride along the lower track 28.

The trailing trolley 22 may take the form of a caster wheel 34 which rides on the track 28. The intermediate trolley 20 may be detachably connected with the underside of the carrier 14 and is equipped with a plurality of wheels 36 which ride along the track 24.

The overall construction of the leading trolley 18 for each carrier is best illustrated in FIG. 2. Each trolley 18 has a rigid body 38 which supports a plurality of wheels 40 that roll along the upper track 24. Guide wheels 42 are mounted on each trolley 18 to turn about vertical axes to maintain the trolley body 38 properly centered on the track 24. A pivot arm 44 carries a retractable trolley dog 46 and a hold back dog 48 which is pivotal on arm 44 about a horizontal axis 50. The dogs 46 and 48 are spaced apart, with the trolley dog 46 spaced forwardly from the hold back dog 48 with respect to the direction of travel of the trolley, as indicated by the directional arrow 51. The arm 44 is mounted to the trolley body 38 to pivot about a horizontal axis provided by a pivot bolt 52. The pivot bolt 52 is located such that the weight of the arm 44 urges its rearward end downwardly or in a clockwise direction as viewed in FIG. 2.

As thus far described, the construction of a conveyor system and the trolley 18 is conventional and is as illustrated and described in U.S. Pat. No. 4,790,247 to Summa which is incorporated herein by reference and to which reference may be made for a more detailed explanation of the trolley construction. The conveyor 10 of the present invention may be equipped with any suitable stop mechanism such as a mechanism of the type described in the referenced patent, U.S. Pat. No. 4,790,247. As described in the referenced patent, the stop mechanism acts against the pivot arm 44 to pivot the arm 44 from the position of FIG. 2 to the position of FIG. 3 when the trolley reaches the location of the stop mechanism along the conveyor path.

The chain 32 is equipped with a plurality of spaced apart drive dogs 54 which project upwardly from the track 28 toward the trolleys 18. One of the drive dogs 54 is normally engaged between the dogs 46 and 48 of each trolley 18. This is the position shown in FIG. 2, and the chain dog 54 then pushes against the retractable dog 46 in order to propel the trolley 18 along its track 24. Each trolley that reaches a stop station has its arm 44 engaged in a manner to pivot the arm 44 in a direction to disengage the retractable dog 46 from the drive dog 54. This is the position of the dogs shown in FIG. 3, and the trolley 18 is stopped because it is no longer propelled by the chain 32.

In accordance with the present invention, each of the trolleys 18 is equipped with an accumulator mechanism which provides a way of stopping each trolley as an alternative to the stop arrangement that stops the trolleys at preselected stop stations arranged along the conveyor track. The accumulator mechanism functions to stop each trolley which approaches a preceding trolley that is stopped along the conveyor track.

The accumulator mechanism includes a pair of spaced apart side plates 56 which are bolted or otherwise secured to a mounting block 58 which is mounted on the trolley body 38. The side plates 56 provide a frame for the accumulator device and are connected with the front end of a draw bar 60 that extends from each of the trolleys 18 to the associated intermediate trolley 20 (see FIG. 1 in particular).

An actuator lever 62 is mounted to pivot between the side plates 56. As shown in FIG. 5, the actuator lever 62 carries a sleeve bushing 64 which extends between the side plates 56. A pin 66 extends between the side plates 56 and through the bushing 64 such that the bushing can turn about the horizontal axis provided by the pin 66. In this manner, the lever 62 is mounted to pivot about the pin 66.

With particular reference to FIGS. 2–4, the actuator lever 62 is provided with an arm 68 on its actuating end. A generally flat plate 70 is mounted on top of the arm 68. The plate 70 has a relatively large surface area and a length to extend the entire length of the arm 68. The plate 70 also has a significant width to accommodate possible misalignment between the accumulator mechanism and the frame 16 of the carrier, as will be explained more fully.

A pivot plate 72 cooperates with lever 62 and is mounted for pivotal movement between the side plates 56. As best shown in FIG. 5, the pivot plate 72 is provided near one end with a pair of sleeves 74. A pivot pin 76 extends through the sleeve 74 and between the side plates 56, thus mounting the pivot plate 72 for movement about the horizontal pivot axis provided by the pin 76. It is noted that the pivot axis for the plate 72 (pin 76) is parallel to but offset from the pivot axis for the actuating lever 62 (pin 66).

The actuator lever 62 is provided on its opposite sides with circular weights 78 which urge the lever to pivot under the influence of gravity in a counterclockwise direction as viewed in FIGS. 2–4. The weights 78 are suitably secured at the desired locations to the opposite sides of the lever 62.

The pivot plate 72 is provided with a curved slot 80 which acts as a cam track for the accumulator mechanism. The cam slot 80 has a dual curvature configuration. With particular reference to FIG. 3, the slot 80 has a small lower end portion 82 which intersects with a longer upper end portion 84 that curves in a different direction and with a different curvature than the lower portion 82. At the intersection between slot portions 82 and 84, a projection 85 (FIG. 3) is formed on the forward edge of slot 80.

A cam roller 86 is carried by the actuating lever 62 and acts in the cam slot 80. As best shown in FIG. 5, the lever 62 is provided with a pair of collars 88 which are located adjacent to opposite sides of the pivot plate 72. The cam roller 86 has a pair of projecting pins 90 which are received to turn within the collars 88, thus mounting the roller 86 for rotation about the horizontal axis provided by the aligned pins 90. The roller 86 has a diameter to fit closely in the cam slot 80. The weights 78 normally maintain the cam roller 86 in the bottom end portion 82 of the slot 80, which is the position of the parts shown in FIG. 2.

The end of the pivot plate 72 opposite the end which is pinned to the side plates 56 is connected with the top end of a generally vertical link 92. The end of the plate is forked, and the upper end of link 92 is pinned at 94 within the forked portion of the pivot plate 72 (see FIG. 5). The lower end of the link 92 is pinned at 96 to a lug 98 projecting upwardly from the arm 44 of the trolley 18. The pivot pin 96 is offset from the pivot bolt 52 of arm 44 such that upward movement of the link 92 pivots arm 44 in a counterclockwise direction as viewed in FIGS. 2 and 3, thus raising the retractable dog 46 to disengage it from the chain dog 54 (see FIG. 3).

In normal operation of the conveyor system, the chain 32 is driven along its track 28, and the engagement of the chain drive dog 54 against the retractable trolley dog 46 drives the lead trolley for each carrier 14 along track 24. Due to the presence of the weights 78, actuator lever 78 is urged in a counterclockwise direction such that the cam roller 86 is urged downwardly into the lower portion 82 of the cam slot 80. The pivot plate 72 is urged by its own weight in a clockwise direction as viewed in FIG. 2, as is the arm 44. Consequently, the trolley dog 46 is normally maintained in engagement with the drive dog 54 in the position shown in FIG. 2.

When the leading trolley 18 of a carrier approaches the back end of a preceding carrier which is stopped on the conveyor track, the plate 70 of actuating lever 62 moves against the underside of the preceding conveyor frame 16 in the manner best shown in FIG. 3. The pressure of the carrier frame 16 acts downwardly on the plate 70 to pivot arm 68 downwardly or in a clockwise direction as viewed in FIG. 3. This initial pivotal movement of the actuator lever 62 raises the cam roller 86 within slot 80 and causes the cam roller 86 to move out of the lower slot portion 82 and act against the inward projection 85 located at the intersection between the slot portions 82 and 84. Because the projection 85 is closer to the lever pivot pin 66 than the corresponding edge of slot portion 82, the action of the cam roller against projection 85 causes the pivot plate 72 to pivot in a counterclockwise direction as viewed in FIG. 3, or in a direction opposite the pivotal movement of the lever 62. This pivotal movement of plate 72 raises the pivot pin 94 and pulls link 92 upwardly to in turn pivot arm 44 in a counterclockwise direction as viewed in FIG. 3. This raises the retractable dog 46 until it is disengaged from the chain dog 54, and the trolley 18 then stops. Consequently, the carrier 14 is accumulated and stops at a position immediately behind the preceding carrier in order to avoid collisions between the carriers. If another carrier should approach the second stationary carrier, the same accumulation effect is carried out by its accumulator mechanism.

The contour of the slot 80 is such that a small amount of pivoting of the actuator lever 62 is sufficient to cause the cam roller to move onto the projection 85, thus completely retracting the trolley dog 46 to stop the trolley with only a small amount of pivoting of the actuating lever 62 required. Therefore, even if the parts of the mechanism are bent or otherwise deformed, the lever 62 will still be able to contact the carrier frame 16 sufficiently to carry out the small degree of pivoting of the actuator lever that is needed to effect detachment of the retractable dog 46 from the chain dog 54. In this respect, the presence of the relatively long actuator lever arm 68 and a similarly long actuating plate 70 is important because the plate 70 is able to come into contact with the carrier frame 16 even if it is bent or otherwise deformed. The breadth of the plate 70 from side to side is also important in this respect.

Clockwise pivotal motion of the actuator lever 62 beyond the position shown in FIG. 3 merely causes the cam roller 86 to move upwardly within slot portion 84 in what is essentially lost motion that does not change the position of the pivot plate 72, link 92 or pivot arm 44. Once the parts have reached the position of FIG. 3, slot portion 84 occupies an arc centered on pin 66 so that the cam roller 86 can move freely in slot portion 84 without disturbing the pivotal position of plate 72. At the same time, plate 72 is unable to pivot about pin 76, and dog 46 remains in the retracted position. As a result, over travel of the parts takes place without causing binding of the parts or other forces between them that could cause damage. Again, this feature allows the mechanism to function effectively without damaging any of the operating components even if the parts or portions thereof are bent upwardly or downwardly or sidewardly.

When the immediately preceding carrier is advanced, the actuating lever 62 is released from it, and the weights 78 together with the weight of the various parts of the mechanism return the parts to the position shown in FIG. 2. Then, the next chain dog 54 that approaches is able to enter the space between the trolley dogs 46 and 48 and act against the retractable dog 46 in order to drive the trolley along the conveyor track. The hold back dog 48 is able to pivot about pin 50 to accommodate entry of the chain dog 54 and is then positioned to act against the trailing surface of dog 54 in order to prevent the trolley from over running the chain 32 on downhill runs of the conveyor system.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. In a conveyor system having a carrier for articles to be conveyed, a driven conveyor element carrying drive dogs, a trolley supporting said carrier and riding on a track, and an arm on the trolley having a trolley dog and pivotal on the trolley about an arm pivot axis between a trolley drive position wherein the trolley dog is engaged by a drive dog to drive the trolley and a release position wherein the trolley and drive dogs are disengaged, an actuator mechanism comprising:

an actuator lever mounted on the trolley for pivotal movement about a first axis offset from the arm pivot axis, said lever being engageable upon approaching a preceding carrier to be pivoted by the preceding carrier about said first pivot axis from a first position to a second position;

a pivot plate mounted on the trolley for pivotal movement about a second axis offset from said first axis and from the arm pivot axis;

a cam arrangement operative to effect camming interaction between said actuating lever and pivot plate in a manner to pivot said plate about said second axis from a first position to a second position in response to pivotal movement of the actuating lever from the first position thereof to the second position thereof; and said pivot plate being coupled with said arm in a manner to move said arm to the release position when said pivot plate is pivoted to the second position thereof.

2. In the conveyor system as set forth in claim 1, including a lifting link connected to said pivot plate and to said arm for lifting said arm to the release position when the pivot plate is pivoted to the second position thereof.

3. In the conveyor system as set forth in claim 1, wherein said actuator lever pivots from the first position to the second position thereof in one pivotal direction and said pivot plate pivots from the first position to the second position thereof in a pivotal direction opposite said one pivotal direction.

4. In the conveyor system as set forth in claim 3, including a lifting link connected to said pivot plate and to said arm for lifting said arm to the release position when the pivot plate is pivoted to the second position thereof.

5. In the conveyor system as set forth in claim 1, wherein said cam arrangement includes:

a curved cam surface on one of said actuator lever and pivot plate; and a cam on the other of said actuator lever and pivot plate, said cam acting against said cam surface during movement of said lever from the first position to the second position thereof in a manner to pivot said plate from the first position to the second position thereof by camming action.

6. In the conveyor system as set forth in claim 1, wherein the first and second pivot axes are arranged and located to urge said actuator lever and pivot plate toward the first positions thereof under the influence of gravity.

7. In the conveyor system as set forth in claim 1, wherein said cam arrangement includes:

a curved cam track on said pivot plate; and a cam on said actuator lever mating with and riding on said cam track and interacting therewith during movement of said lever from the first position to the second position thereof to cam said plate from the first position to the second position thereof.

8. In the conveyor system as set forth in claim 7, wherein said cam track includes a portion on which said cam rides during pivotal movement of said lever beyond the second position thereof, said cam track portion being arranged and located to accommodate movement of the cam thereon without having a significant effect on the pivotal position of said pivot plate.

9. In the conveyor system as set forth in claim 8, including a plate portion of said lever located to engage the preceding carrier.

10. In the conveyor system as set forth in claim 7, wherein said cam includes a roller element moving on said cam track.

11. In a conveyor system having a carrier for articles to be conveyed, a driven conveyor element carrying drive dogs, a trolley supporting said carrier and riding on a track, and an arm on the trolley having a trolley dog and movable between a trolley drive position wherein the trolley dog is engaged by a drive dog to drive the trolley and a release position wherein the trolley and drive dogs are disengaged, an actuator mechanism comprising:

an actuator lever mounted on the trolley for pivotal movement about a first axis, said lever being engageable upon approaching a preceding carrier to be pivoted by the preceding carrier about said first pivot axis from a first position to a second position;

a pivot plate mounted on the trolley for pivotal movement about a second axis offset from said first axis;

a cam arrangement operative to effect camming interaction between said actuating lever and pivot plate in a manner to pivot said plate about said second axis from a first position to a second position in response to pivotal movement of the actuating lever from the first position thereof to the second position thereof; and said pivot plate being coupled with said arm in a manner to move said arm to the release position when said pivot plate is pivoted to the second position thereof, said cam arrangement including:

a curve cam track on said pivot plate, and a cam on said actuator lever mating with and riding on said cam track and interacting therewith during movement of said lever from the first position to the second position thereof to cam said plate from the first position to the second position thereof, said cam track comprising a slot in said pivot plate in which said cam is captured.

12. In the conveyor system as set forth in claim 11, wherein said cam includes a roller element captured in said slot.

13. In a conveyor system having a carrier for articles to be conveyed, a driven conveyor element carrying drive dogs, a trolley supporting said carrier and riding on a track, and an arm on the trolley having a trolley dog and movable between a trolley drive position wherein the trolley dog is engaged by a drive dog to drive the trolley and a release position wherein the trolley and drive dogs are disengaged, an actuator mechanism comprising:

an actuator lever mounted on the trolley for pivotal movement about a first axis, said lever being engageable upon approaching a preceding carrier to be pivoted by the preceding carrier about said first pivot axis from a first position to a second position;

a pivot plate mounted on the trolley for pivotal movement about a second axis offset from said first axis;

a cam arrangement operative to effect camming interaction between said actuating lever and pivot plate in a manner to pivot said plate about said second axis from a first position to a second position in response to pivotal movement of the actuating lever from the first position thereof to the second position thereof; and said pivot plate being coupled with said arm in a manner to move said arm to the release position when said pivot plate is pivoted to the second position thereof, said cam arrangement including:
a cam on said actuating lever offset from said first axis,
a curved cam slot on said pivot plate receiving said cam,
a first portion of said slot in which said cam travels during pivotal movement of said lever from the first to the second position thereof, said first portion having a location and configuration to interact with said cam to pivot said plate from the first to the second position thereof during movement of the cam in said first portion as the lever pivots from the first to the second position thereof, and
a second portion of said slot intersecting with said first portion and receiving said cam during pivotal movement of said lever beyond the second position thereof, said second portion having a location and configuration to accommodate movement of said cam therein without substantially affecting the position of said pivot plate.

14. In the conveyor system as set forth in claim 13, wherein said cam comprises a roller received in said slot.

15. In the conveyor system as set forth in claim 13, including a plate portion of said lever located to engage the preceding carrier.

16. In a conveyor system having a carrier for articles to be conveyed, a driven chain carrying drive dogs, a trolley supporting the carrier and riding on a track, a pivot arm on the trolley pivotal about a pivot arm axis between a drive position and a release position, a trolley dog on the pivot arm engaged by a drive dog to drive the trolley in the drive position of the pivot arm and disengaged from the drive dogs in the release position of the pivot arm, and a stop mechanism for effecting pivoting of the arm from the drive position to the release position at a stop location along the track, an actuator mechanism operable independently of said stop mechanism comprising:
an actuator lever mounted on the trolley for pivotal movement about a first substantially horizontal axis offset from the pivot arm axis, said lever having an actuator end portion offset from said first axis which is engageable with a preceding carrier approached by the trolley to effect pivoting of the lever about said first axis from a first position to a second position;
a pivot plate mounted on the trolley for pivotal movement about a second axis offset from and substantially parallel to said first axis and the pivot arm axis;
cam means for pivoting said plate about said second axis from a first position thereof to a second position thereof in response to pivotal movement of said lever from the first position thereof to the second position thereof; and
a linkage between said pivot plate and arm for pivoting the arm from the drive position to the release position when said pivot plate is pivoted from the first position thereof to the second position thereof.

17. In the conveyor system as set forth in claim 16, wherein the first and second pivot axes are arranged and located to urge said actuator lever and pivot plate toward the first positions thereof under the influence of gravity.

18. In the conveyor system as set forth in claim 16, wherein said actuator lever pivots from the first position to the second position thereof in one pivotal direction and said pivot plate pivots from the first position to the second position thereof in a pivotal direction opposite said one pivotal direction.

19. In the conveyor system as set forth in claim 16, wherein said cam means comprises:
a curved cam track on said pivot plate; and
a cam on said actuator lever mating with and riding on said cam track and interacting therewith during movement of said lever from the first position to the second position thereof to cam said plate from the first position to the second position thereof.

20. In the conveyor system as set forth in claim 19, wherein said cam track includes a portion on which said cam rides during pivotal movement of said lever beyond the second position thereof, said cam track portion being arranged and located to accommodate movement of the cam thereon without having a significant effect on the pivotal position of said pivot plate.

21. In the conveyor system as set forth in claim 16, wherein said cam means comprises:
a cam on said actuating lever offset from said first axis;
a curved cam slot on said pivot plate receiving said cam;
a first portion of said slot in which said cam travels during pivotal movement of said lever from the first to the second position thereof, said first portion having a location and configuration to interact with said cam to pivot said plate from the first to the second position thereof during movement of the cam in said first portion as the lever pivots from the first to the second position thereof; and
a second portion of said slot intersecting with said first portion and receiving said cam during pivotal movement of said lever beyond the second position thereof, said second portion having a location and configuration to accommodate movement of said cam therein without substantially affecting the position of said pivot plate.

22. In a conveyor system having a carrier for articles to be conveyed, a driven chain carrying drive dogs, a trolley supporting the carrier and riding on a track, a pivot arm on the trolley pivotal between a drive position and a release position, a trolley dog on the pivot arm enraged by a drive dog to drive the trolley in the drive position of the pivot arm and disengaged from the drive dogs in the release position of the pivot arm, and a stop mechanism for effecting pivoting of the arm from the drive position to the release position at a stop location along the track, an actuator mechanism operable independently of said stop mechanism comprising;
an actuator lever mounted on the trolley for pivotal movement about a first substantially horizontal axis, said lever having an actuator end portion offset from said first axis which is engageable with a preceding carrier approached by the trolley to effect pivoting of the lever about said first axis from a first position to a second position;
a pivot plate mounted on the trolley for pivotal movement about a second axis offset from and substantially parallel to said first axis;
cam means for pivoting said plate about said first axis from a first position thereof to a second position thereof in response to pivotal movement of said lever from the first position thereof to the second position thereof; and
a linkage between said pivot plate and arm for pivoting the arm from the drive position to the release position when said pivot plate is pivoted from the first position thereof to the second position thereof, said cam means comprising:
- a cam on said actuating lever offset from said first axis,
- a curved cam slot on said pivot plate receiving said cam,
- a first portion of said slot in which said cam travels during pivotal movement of said lever from the first to the second position thereof, said first portion having a location and configuration to interact with said cam to pivot said plate from the first to the second position thereof during movement of the cam in said first portion as the lever pivots from the first to the second position thereof, and
- a second portion of said slot intersecting with said first portion and receiving said cam during pivotal movement of said lever beyond the second position thereof, said second portion having a location and configuration to accommodate movement of said cam therein without substantially affecting the position of said pivot plate, said cam comprising a roller received in said slot.

23. An actuating mechanism for a conveyor system having a carrier supported on a track mounted trolley, a drive conveyor element carrying drive dogs, a pivot arm on the trolley pivotal thereon about a pivot arm axis between drive and release positions, and a trolley dog on said arm driven by a drive dog in the drive position of the arm released from the drive dog in the release position of the arm, said mechanism comprising:

- an actuator lever mounted on the trolley for pivotal movement about a first substantially horizontal axis offset from the pivot arm axis, said lever having an actuator end portion offset from said first axis which is engageable with a preceding carrier approached by the trolley to effect pivoting of the lever about said first axis from a first position to a second position;
- a pivotal plate mounted on the trolley for pivotal movement about a second axis offset from and substantially parallel to said first axis and the pivot arm axis;
- a curved cam track on said pivot plate;
- a cam on said actuator lever mating with and riding on said cam track and interacting therewith during movement of said lever from the first position to the second position thereof to cam said plate from the first position to the second position thereof; and
- a linkage for pivoting said pivot arm from the drive position to the release position in response to movement of said pivot plate from the first to the second position thereof.

24. A mechanism as set forth in claim 23, wherein said cam track includes a portion on which said cam rides during pivotal movement of said lever beyond the second position thereof, said cam track portion being arranged and located to accommodate movement of the cam thereon without having a significant effect on the pivotal position of said pivot plate.

25. A mechanism as set forth in claim 23, wherein said cam comprises a roller riding on said cam track.

* * * * *